(12) United States Patent
Dressler

(10) Patent No.: US 7,581,333 B2
(45) Date of Patent: Sep. 1, 2009

(54) ADHESIVE BACKED MEASURING TAPE

(76) Inventor: Gary S. Dressler, 2043 S. Lyon, Santa Ana, CA (US) 92705

( * ) Notice: Subject to any disclaimer, the term of this patent is extended or adjusted under 35 U.S.C. 154(b) by 0 days.

(21) Appl. No.: 11/439,021

(22) Filed: May 24, 2006

(65) Prior Publication Data

US 2007/0271806 A1  Nov. 29, 2007

(51) Int. Cl.
*G01B 3/10* (2006.01)

(52) U.S. Cl. ............... 33/758; 33/494; 33/759

(58) Field of Classification Search .............. 33/758, 33/759, 760, 771, 483, 485, 486, 487, 492, 33/493, 494; D10/71
See application file for complete search history.

(56) References Cited

U.S. PATENT DOCUMENTS

| | | | | | |
|---|---|---|---|---|---|
| D259,706 | S | * | 6/1981 | Smith | D10/71 |
| D260,738 | S | * | 9/1981 | Smith | D10/71 |
| 4,310,509 | A | * | 1/1982 | Berglund et al. | 424/448 |
| 4,351,113 | A | * | 9/1982 | Eggertsen et al. | 33/758 |
| 4,367,590 | A | * | 1/1983 | Winter et al. | 33/758 |
| 4,732,808 | A | * | 3/1988 | Krampe et al. | 428/355 CN |
| 4,845,858 | A | * | 7/1989 | Thomas | 33/759 |
| 4,942,670 | A | * | 7/1990 | Brandt | 33/494 |
| 5,012,590 | A | * | 5/1991 | Wagner et al. | 33/759 |
| 5,107,601 | A | * | 4/1992 | Semchuck | 33/759 |
| 5,216,700 | A | * | 6/1993 | Cherian | 378/163 |
| 5,452,523 | A | * | 9/1995 | Jansen | 33/555.4 |
| D399,769 | S | * | 10/1998 | Taylor | D10/71 |
| 6,067,722 | A | * | 5/2000 | Goodyer et al. | 33/758 |
| 6,082,018 | A | * | 7/2000 | Wells | 33/759 |
| 6,145,215 | A | * | 11/2000 | Graston et al. | 33/759 |
| 6,360,448 | B1 | * | 3/2002 | Smyj | 33/562 |
| 6,415,199 | B1 | * | 7/2002 | Liebermann | 700/132 |
| 6,511,741 | B1 | * | 1/2003 | Hungarter | 428/343 |
| 6,637,124 | B2 | * | 10/2003 | Pederson | 33/758 |
| 6,772,532 | B1 | * | 8/2004 | Honea | 33/759 |
| D510,286 | S | * | 10/2005 | Manning | D10/71 |
| 7,059,061 | B2 | * | 6/2006 | French | 33/494 |
| D571,239 | S | * | 6/2008 | Holmes | D10/71 |
| 2001/0042315 | A1 | * | 11/2001 | Dixon | 33/758 |
| 2002/0148134 | A1 | * | 10/2002 | Meyer et al. | 33/758 |
| 2005/0257393 | A1 | * | 11/2005 | Spanski et al. | 33/758 |
| 2007/0283589 | A1 | * | 12/2007 | Garcia | 33/758 |
| 2008/0201975 | A1 | * | 8/2008 | Gingerella et al. | 33/758 |
| 2008/0209749 | A1 | * | 9/2008 | Chua | 33/758 |
| 2008/0307666 | A1 | * | 12/2008 | Mattsson et al. | 33/759 |

FOREIGN PATENT DOCUMENTS

JP  57128801 A  *  8/1982

* cited by examiner

*Primary Examiner*—Richard A Smith
(74) *Attorney, Agent, or Firm*—Edward E. Roberts

(57) ABSTRACT

The invention includes a flexible, removable and reusable adhesive backed tape constructed in the conventional form of a flat elongate strip having measurement indicia printed on the opposite non-adhesive surface. The indicia include selected measurement markings divided into prescribed segments that are replicated sequentially along the length of the tape. The tape further includes a straight level indicator line and spaces for erasable writings.

10 Claims, 7 Drawing Sheets

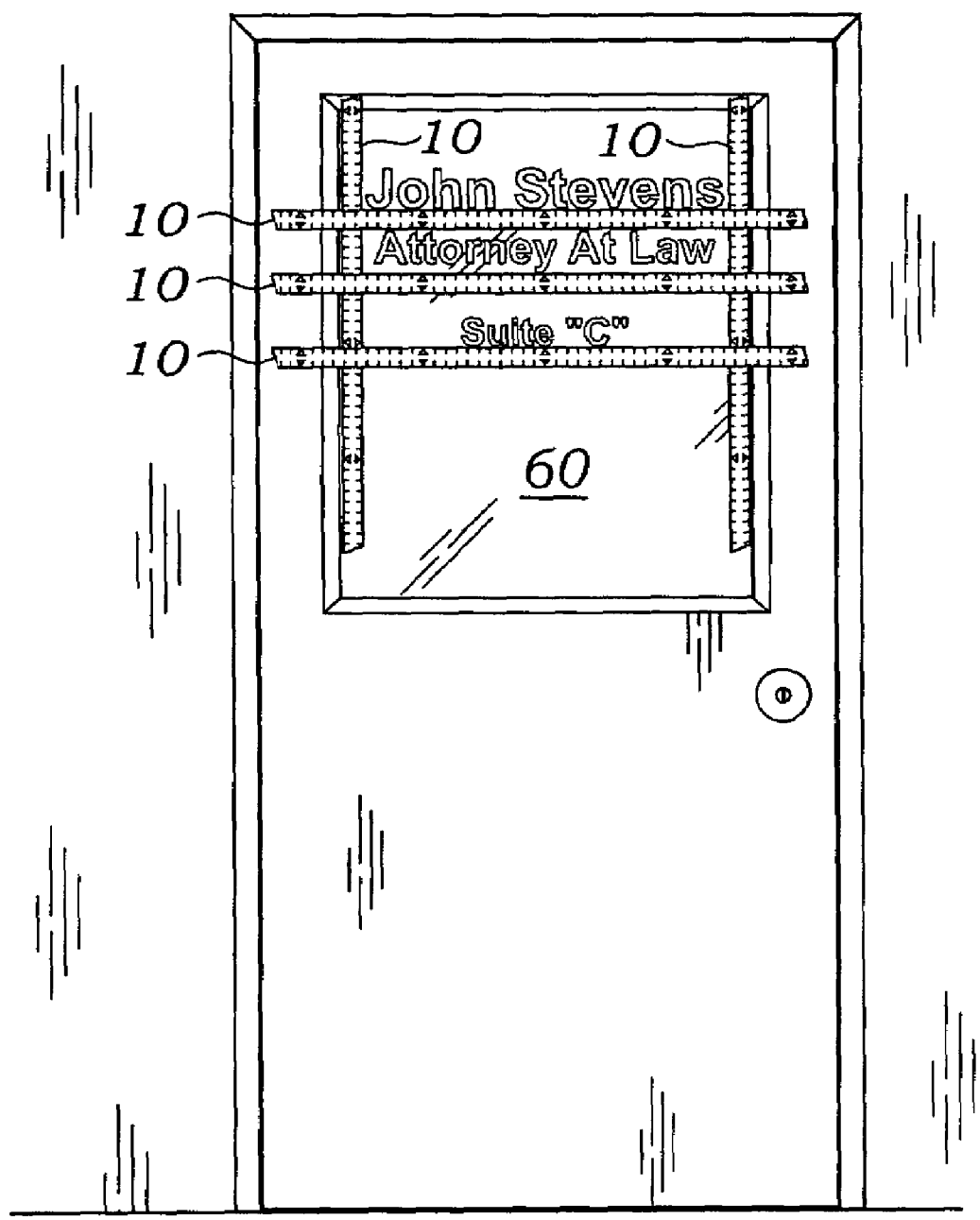

ADHESIVE BACKED MEASURING TAPE

BACKGROUND

The background of the invention will be discussed in two parts.

1. Field of the Invention

The invention relates to measurement tapes and particularly to a flexible removable and reusable adhesive backed tape constructed in the form of an elongate strip having measurement indicia printed on the non-adhesive surface thereof including sequentially repeated measurement sections.

2. Description of the Related Art

Means for measuring lengths are old in the art. They have taken many forms and are used in innumerable manners. In many of the uses other instruments and tools have been employed with the selected measuring means to obtain a desired result. Because of the many uses of the measurement devices and the various instruments often used therewith, the measurement means have constantly evolved in structure and format. A familiar example is the conventional flexible elongated measurement tape of five feet in length with one-inch markings usually divided into one-sixteenth of an inch. The application of a coating of a pressure sensitive adhesive to the back of this tape has further extended its use.

One type of an adhesive backed measuring tape is shown and described in U.S. Pat. No. 4,351,113 entitled "Pressure Sensitive Adhesively Backed Disposable Measuring Tape and Method of Manufacture", issued to Eggertsen et al., on Sep. 28, 1982. This is an elongated flexible measuring tape constructed of adhesive backed crepe paper having measurement indicia printed in a length slightly shorter than the indicated length thus requiring stretching of the tape during use to indicate a true length.

A problem associated with this and other related art tape measurers is that they lack versatility of use, generally limited to length measurements without providing additional useful features that are commonly provided by accessory instruments or tooling. What is needed is a flexible removable and reusable adhesive backed tape constructed in the form of an elongate strip having correct measurement indicia printed on the non-adhesive surface and further including other useful inherent features such as sequentially repeated measurement sections and means for indicating a true level.

SUMMARY

In accordance with the present invention there is provided a removable and reusable adhesive backed measurement tape in the form of an elongate strip having measurement indicia printed on the opposite non-adhesive surface. The indicia include conventional one-inch markings divided in $1/16$ inch segments and have sequentially repeated 12-inch sections. Symbols such as triangles are included along the tape at useful locations, such as at the 4, 8, and 12-inch markers, these symbols accepting writing thereon. A level indicator line extends along the tape enabling a user in one step to create perpendiculars and angular measurements. The tape is easily removed from the working surface without marking the surface.

DRAWINGS

FIG. 6 illustrates use of the tape of the invention to provide accurate vertical, horizontal, or combined orientation references;

DESCRIPTION

In accordance with the invention there is provided a removable adhesive backed measurement tape in the form of an elongate strip having measurement indicia printed on the opposite non-adhesive surface. The indicia include sequential repetitive measurement sections such as conventional 12-inch sections with one-inch markings divided in $1/16$ inch segments, thus essentially providing an "endless" tape. The material of the indicia surface permits easy placement of erasable markings thereon, and the adhesive backing material permits easy removal of the tape from surfaces to which it has been applied, thus making it reusable. The tape is inexpensive and thus may be readily disposed of when it becomes worn or when undesirable foreign material is picked up by the adhesive surface that may inhibit further use. Because of its repetitive measurement sections the tape may be torn at any convenient location either to dispose of a portion or to leave a portion on a work surface and further use the remainder at another location. Further, the flexibility of the tape is such that it may be rolled into a convenient size for handling and storage. A single user can apply the tape across or on a work surface to provide accurate measurements, provide a plumb line and level reference, and mark on the tape and the work surface as desired, all in one step.

Figure 1:
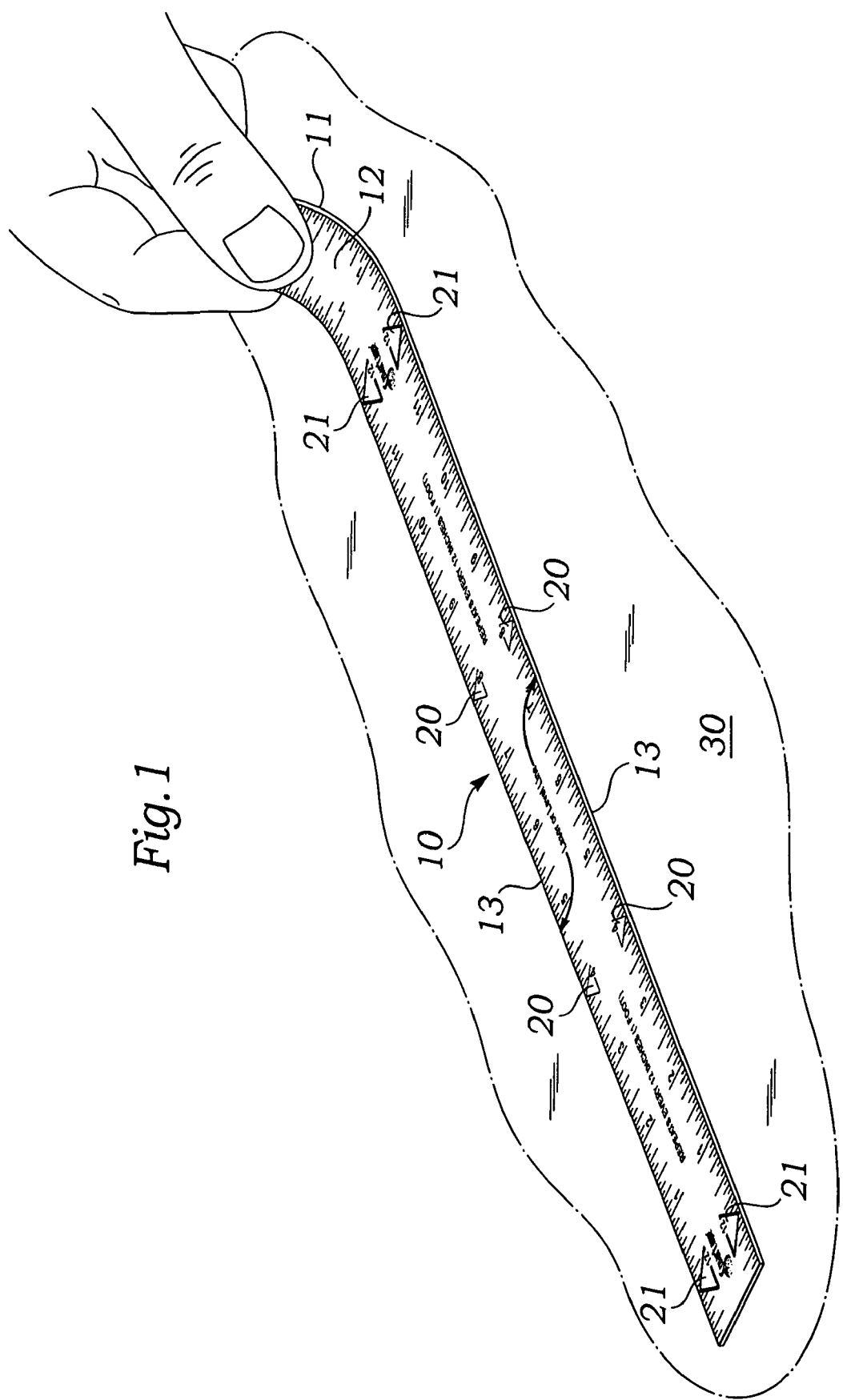
FIG. 1 is a perspective view of the measurement tape embodying features of the invention and illustrating application to a flat surface.

FIG. 1 is a depiction of the tape of the invention, generally designated 10, as it would be applied to a flat surface 30. The tape 10 is flat and flexible with an adhesive backing undersurface 11 and an upper or working surface 12. It extends longitudinally with generally parallel straight edges 13 and is generally constructed having a conventional width of ¾ inch. However, the width can be varied depending on the intended use of the tape, but in any case wide enough to accommodate the indicia on the working surface 12 in accordance with the invention. The tape 10 can be manufactured in a continuous roll, depending on its intended use with the working surface marked off with indicia as will be described.

Figure 2:
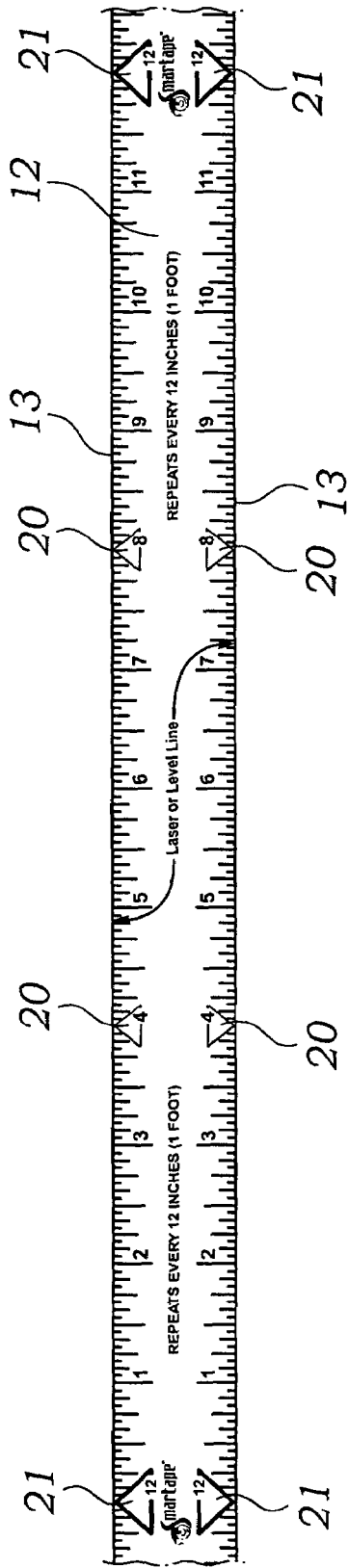
FIG. 2 is a top plan view illustrating the tape of FIG. 1 marked off in repeated sections of 12 inches.

FIGS. 1 and 2 illustrate tape 10 surface indicia including on both edges identically repeated marked off 12-inch measurement sections that are subdivided into $1/16$-inch segments. The 12-inch sections are laid out identically on both edges having the same starting point with matched indicia. That is, located directly opposite each other are matching equilateral triangles 20 shown placed at the 4" and 8" locations, with directly opposite and matching larger triangles 21 placed at the 12" locations, these triangles positioned to provide means for location of wall studs. Thus, the 12 inch sections and the triangles 20 and 21 are repeated identically on both edges so that respective distance measurements and triangles match up identically. Equilateral triangles 20 are shown with bases parallel to respective edges and with their apex pointing toward respective edges to denote the 4" and 8" locations. Equilateral triangles 21 are shown with bases parallel to respective edges and with their apex pointing toward respective edges to denote the 12" locations. It is understood that other marked off and divided measurement sections may be sequentially indicated with markings along said tape for establishing other preselected references with other triangles or symbols located as may be desired for other uses in utilizing the repetitive features of the tape. The surface material of the tape 10 is selected to permit erasable marking or writing thereon. For instance, larger triangles 21 include ample space for writing in any particular number or letter reference in utilizing the repetitive features of the tape. Parallel straight-edges 13 are level or "laser" indicator lines that extend along the tape 10 to provide means for self-leveling of the tape 10. Straight edges 13 may include a stiffness feature to provide a more firm straight edge. Ample space is provided between edges 13 for marking or writing thereon in accordance with the invention. Further, a line such as a center line (not shown) may be provided as a level indicator line extending along the surface of the tape 10 to provide means for self-leveling of the tape 10. Since the adhesive backed tape 10 can be placed vertically as well as horizontally on a surface, it can be used to establish a reference plumb line. Thus, it can be used to establish a perpendicular condition or to measure 90-degree angles. Various colors or shading may be used to distinguish the symbols, and/or other indicia on the tape.

Figure 3:
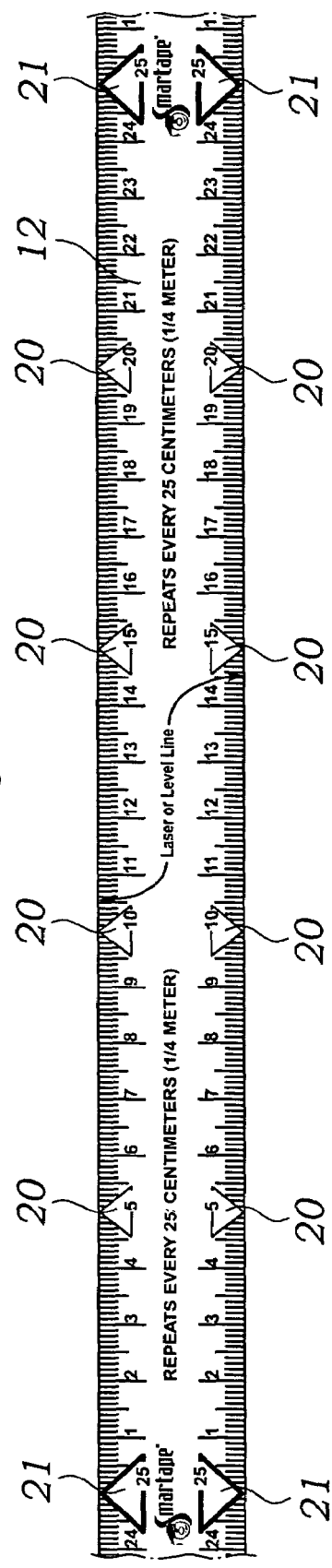
FIG. 3 is a top plan view of the tape of FIG. 1 marked off in repeated sections of 25 centimeters.

FIG. 3 is an example of other symbols and measurement graduations, such as according to the metric system, that may be included on the tape 10, either in conjunction with (not shown) or separate from the English system. For instance, as shown on the upper or non-adhesive surface 12 of FIG. 3 the indicia includes on each edge matching identically repeated 25 centimeter sections that are subdivided into 10 millimeter segments. Triangles 20 are placed directly opposite each other at every five centimeters with larger triangles 21 placed directly opposite each other at every 25 centimeters. Triangles 20 and 21 are configured and oriented as previously described, however, other symbols or indicia may be included and located in accordance with the invention to make the tape 10 more versatile for specific uses.

Figure 4:
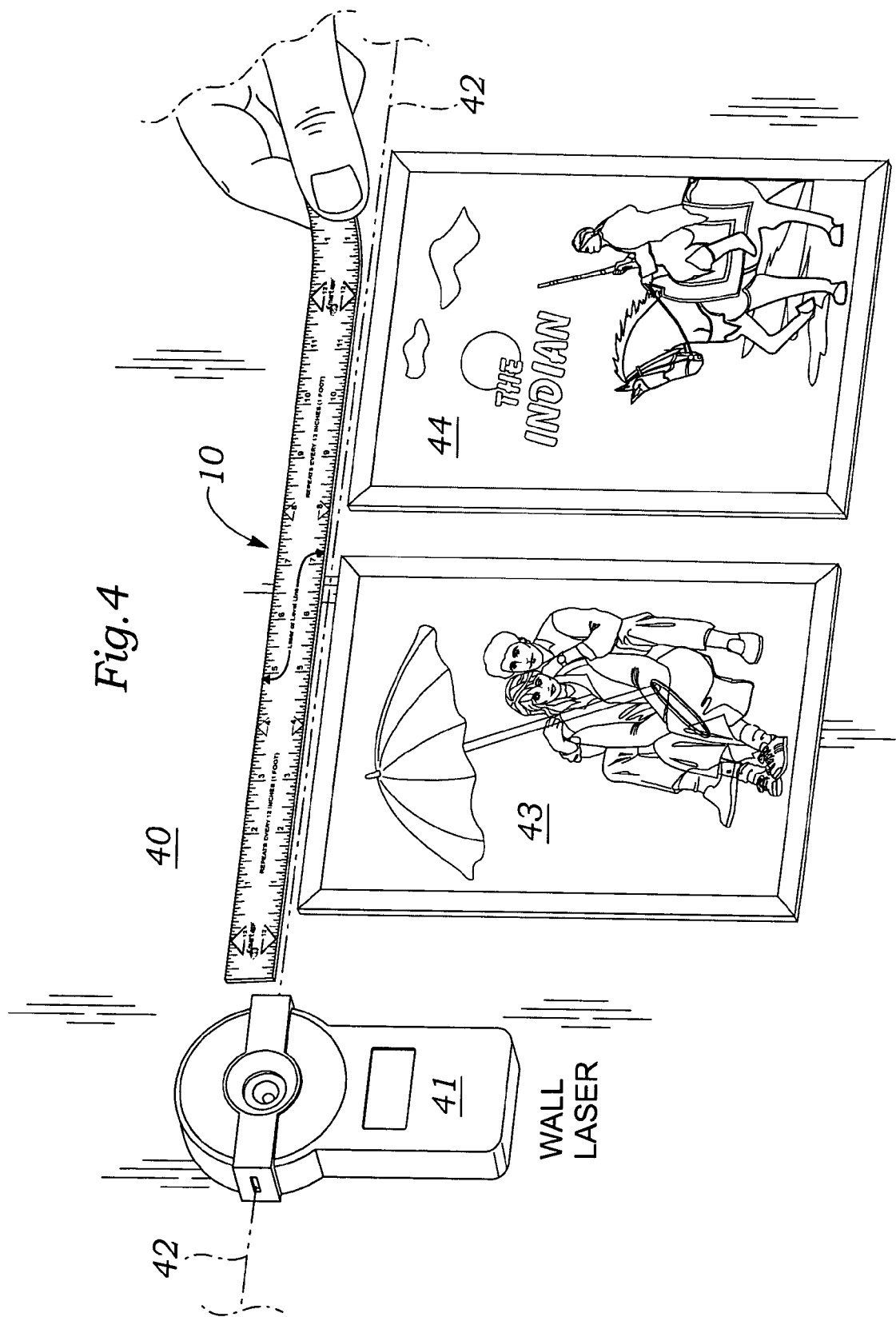
FIG. 4 illustrates use of the tape of FIG. 1 in conjunction with a laser measuring device to hang pictures.

FIG. 4 illustrates an example of use of the tape 10 in conjunction with a laser measuring device 41 to hang pictures or the like. The procedure works equally well in attaching other objects to a generally vertical flat surface. First, although not shown, by use of laser measuring device 41 or other suitable device such as a bubble level, adhesive backed tape 10 can be adhered to the wall 40 vertically from the ceiling, or other selected starting point, thus providing a plumb line from which various desired picture heights can be determined. After the desired heights are determined and marked on the tape 10 or on the wall, the leveling device is used to provide a temporary true horizontal reference line 42 with a tape 10 then laid out horizontally with one of the straight edges 13 along the reference line 42 to thereby establish and maintain a permanent working true horizontal reference line 42. The leveling device can then be removed. The plumb line tape 10 may be left in place to determine other reference heights or if the vertical markings are placed on the wall 40, the original tape can be removed as a plumb line and reused to establish the horizontal reference line 42 for the selected height. Alternatively, a portion of adequate length can be torn from another tape since selected triangles 20, 21 and the 12 inch markings are repetitive such that any of the markings can be placed to start at any selected point.

After tape 10 has been adhered along the level reference line 42 it is often desirable to fasten the pictures to wall studs in order to obtain sufficient support. Wall studs can initially be found by such means as a magnetic nail finder, checking for nails under the base boards, or locating the seam between adjoining wall boards. Since the studs are commonly spaced 16 inches, center to center, once one is located, with use of tape 10 with its repeated 12 inch sections, distances are measured off in multiples of 16 inches from that stud to locate other studs. Thus, once an initial stud is located tape 10 is adhesively affixed to the work surface with a triangle 20 placed at the center of the stud, the next stud to be found 16 inches further along the tape. That is, if the tape 10 is laid out on the work surface starting at the center of the initial stud, then by going to the 12" triangle, and then to the next 4" triangle, the 16" stud distance to the next stud is easily obtained. In like manner, if the triangle at the 4 inch mark is placed at the center of the initial stud, the center of the next stud is located by passing over the next 8 inch mark and continuing on to the triangle at the next 8 inch mark. Then in locating the next stud the user goes from the 4" triangle past the next 12" inch marker to the next 8" triangle, and so on.

Once the studs are located any desired measurements, such as the hanging center points, separation distance, and start and stop points of pictures 43, 44 can be established and marked on the tape 10 or wall 40 as needed. Additionally, the pictures 43, 44 can be leveled by aligning their tops, or other reference points, to the reference line 42. It is thus seen that with a horizontal reference line and use of tape 10 as described, all required placement measurements are easily obtained and provided for desired placement of pictures 43, 44. Other desired objects may likewise be positioned at other heights.

Figure 5:
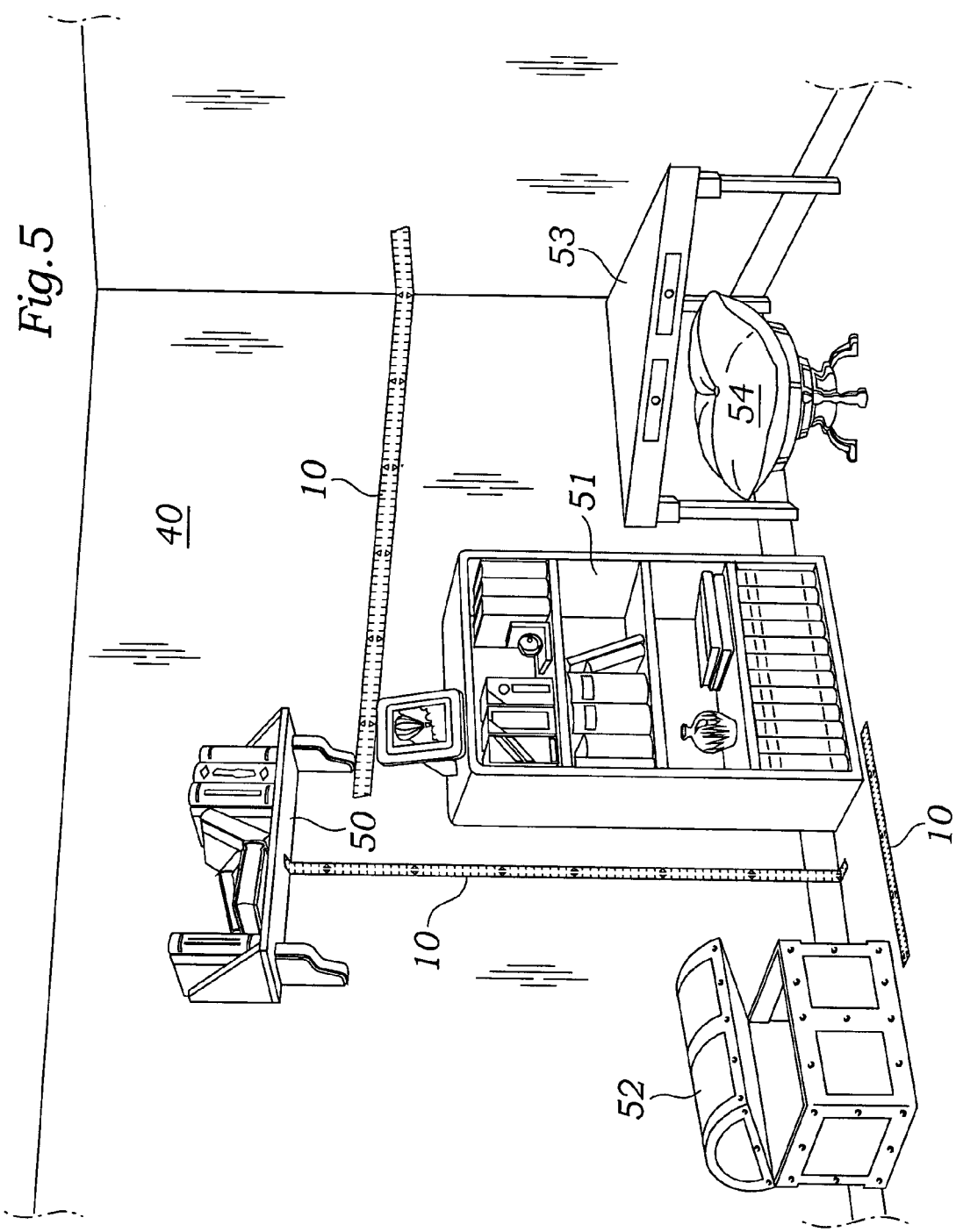
FIG. 5 illustrates use of the tape of the invention as a space planning tool.

FIG. 5 illustrates an example of the use of the tape 10 as a space planning tool to pre-measure a specific space or area for placement of desired items. Thus, a theoretical space use arrangement can be checked for suitability prior to beginning placement of the items. For instance, utilizing various sections of a tape 10 as described in the hanging of pictures, the bookshelf 50, bookcase 51 and trunk 52 can be virtually located and spaced. Likewise, the three sided corner piece 53 and associated stool 54 can be selected and virtually positioned. All center points, start and stop points and separation distances of the items can be established and marked on the tape 10 or wall 40 as needed. Thus, any necessary placement modifications or item changes can be made prior to item installation. After completion of the project any tapes used are then easily removed from the working surface.

FIG. 6 illustrates use of the tape 10 to provide accurate spaced measurements and intervals for vertical, horizontal, or combined orientation references. As seen, a tape 10 is placed on each side of the working space 60, an office door, to provide a plumb line as well as vertical reference points, and additionally required tapes 10 (or portions thereof), by use of an appropriate leveling procedure, then placed horizontally at selected heights by alignment to corresponding distances on the vertical tapes 10. Letters or other indicia are then placed relative to each other on the different levels as desired using the repeated measurement sections as previously described in the locating and hanging of pictures. For instance, once a plumb line is determined and a first tape 10 applied vertically to established the plumb line, an apex of a matching triangle on opposite edges of a second tape 10 can aligned with a straight edge of the first tape 10 to establish horizontal references. Likewise, by the same method, a horizontal reference line can first be determined and then matching triangles coacting with straight edges can be utilized to establish vertical references. Thus, in accordance with the invention, use of the tape 10 provides accurate placement of indicia on doors, windows, or other vertical surfaces. The procedure applies equally well in the provision of accurate placement of indicia on horizontal surfaces.

Figure 7A:
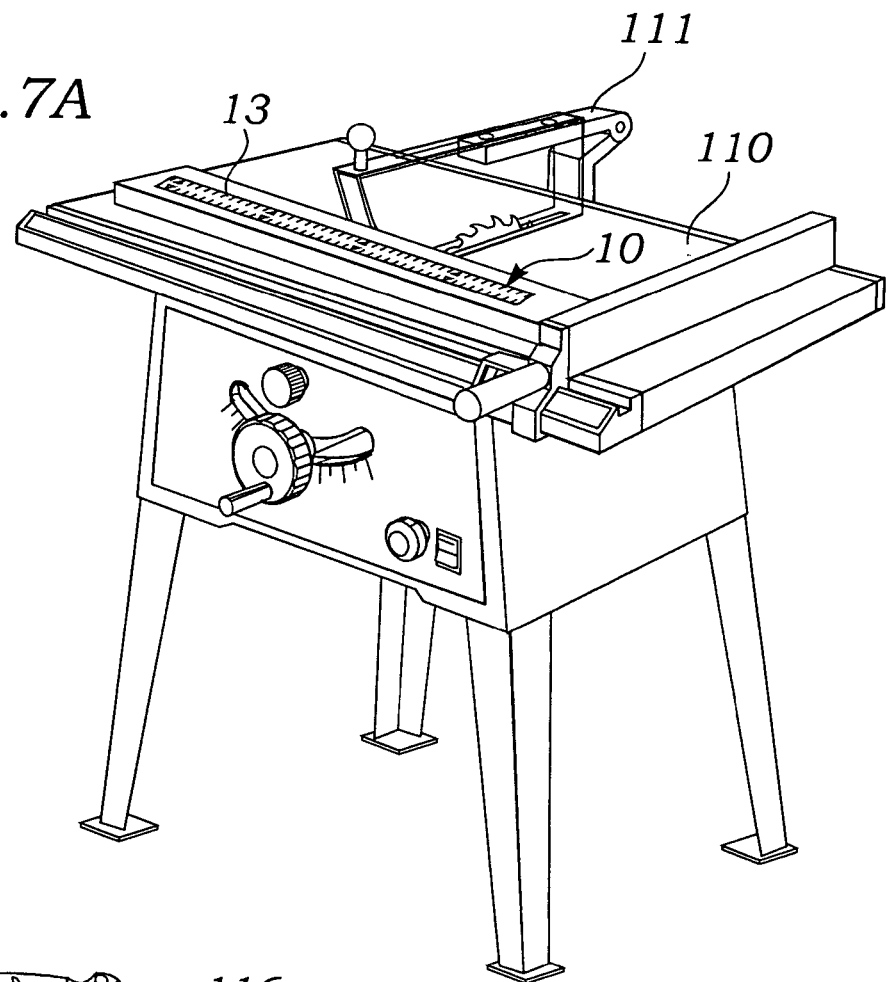
FIG. 7A is a perspective view of use of the tape of tape of the invention illustrating determination of cutting locations for sawing of materials.

FIG. 7A is a perspective view of use of the tape 10 illustrating determination of desired cutting locations for table saws. In this example, the material 110 is desired to be cut at certain locations by saw 111. As shown the tape 10 is applied to the material 110 from the end thereof with the level line 13 perpendicular to the desired line of cut. The cut locations are located and marked on the tape 10 with the cut made as indicated without leaving a measurement mark on the material 110 once the tape 10 is removed.

Figure 7B:
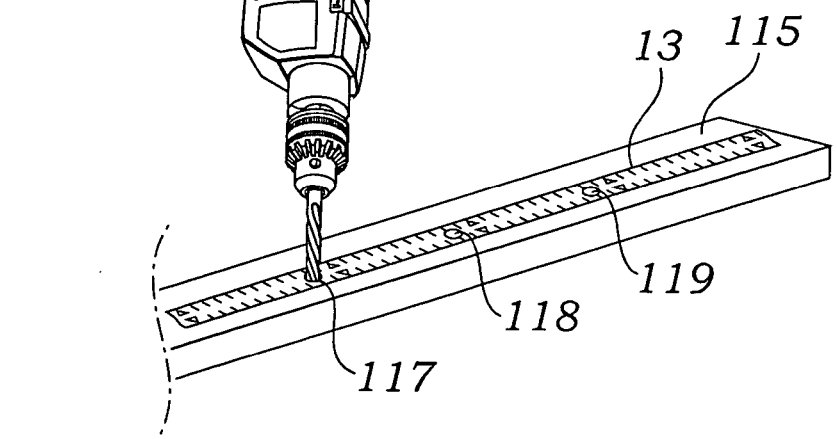
FIG. 7B is a perspective view of use of the tape of the invention illustrating locating, marking and drilling of holes at a selected location.

FIG. 7B illustrates use of the tape 10 in locating, marking and drilling of holes in a selected surface. In this example, in the material 115 it is desired to use drill 116 to provide holes 117-119 a certain distance apart and at a certain distance from an end of the material 115. The adhesive tape 10 is applied to the material 115 from the end thereof with a level line 13 provided, as previously discussed, along the desired line of the holes 117-119 to be drilled. The distances desired for the holes 117-119 is then located on the tape 10 and the drill 116 used to provide holes 117-119 straight and accurately without leaving a measurement mark on the material 115 once the tape 10 is removed.

Figure 8:
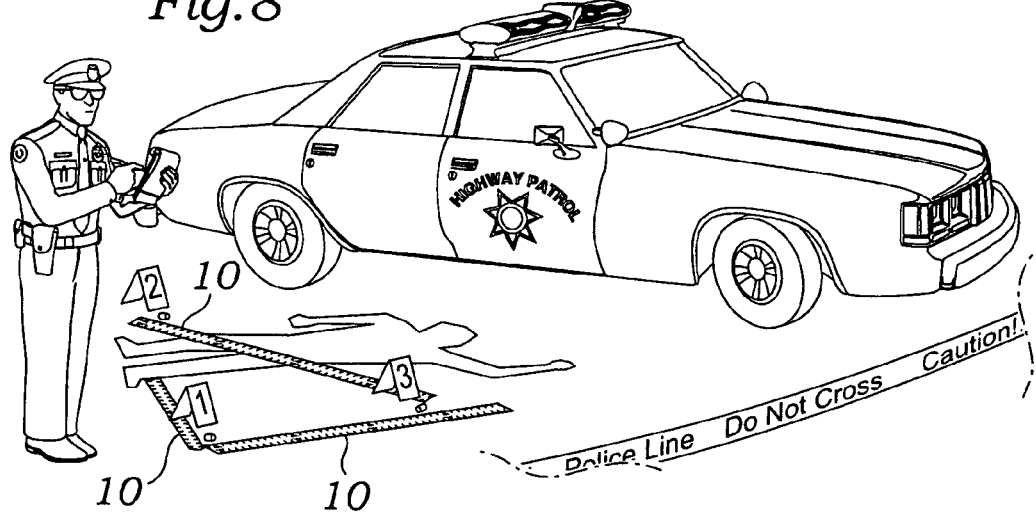
FIG. 8 illustrates use of the tape of the invention where accurate measurements relative to object distances are required.

FIG. 8 illustrates use of the tape 10 where accurate relative distance and configuration of objects is important, as in layout of a crime scene. As illustrated, all relevant locations and distances are laid out at the scene of the event and recorded as desired. In this use the tape 10 can be of a stronger material with industrial adhesives as may be necessary. The procedure may likewise be used in many other applications, such as auto accident investigations, in conjunction with photographic evidence as a "size to scale" instrument, establish impact angles or in any other situation where accurate measurements relative to object distances are desired.

Figure 9:
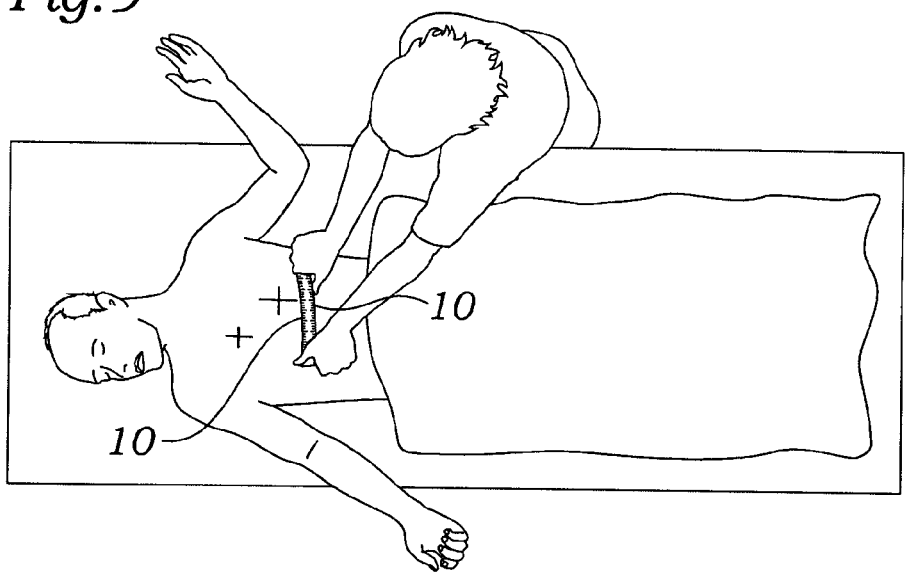
FIG. 9 illustrates use of the tape of the invention where accurate measurements are required in medical environments.

FIG. 9 illustrates use of the tape of the invention where accurate measurements are required in medical environments such as surgical, radiological treatment, magnetic resonance imaging, computed tomography (MRI or CRT), or ultra sound. Traditional measuring devices are not free from microbial contaminants thus rendering them inadequate for medical use, whereas the tape 10 of the invention can be constructed of antibacterial treated adhesives that are sterile and free of contamination. Thus, a tape 10 so constructed will provide the medical technician with a safe tool for efficiently obtaining exact points of reference and measurements in the various medical environments. The tape can remain attached and removed as may be needed.

Figure 10:
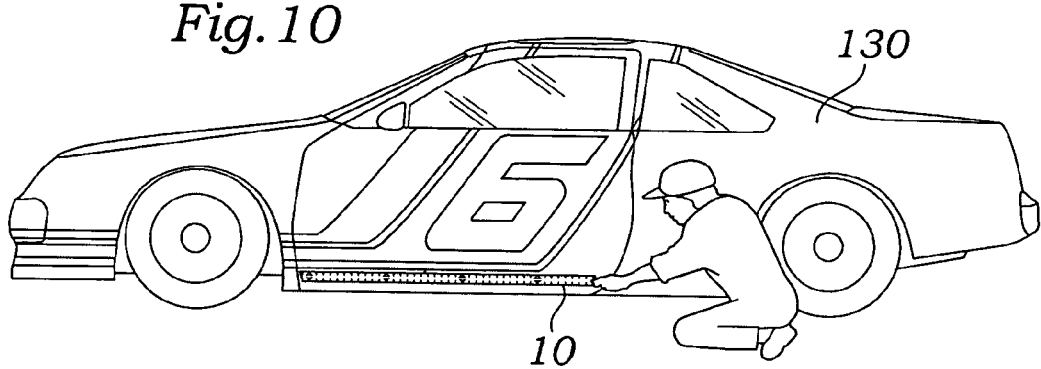
FIG. 10 illustrates use of the tape of the invention in measuring and exacting a true line in the painting or marking of a vehicle.

FIG. 10 illustrates the use of the tape 10 as a space planning tool to provide a true straight reference line and pre-measure a specific space or area for painting or marking of a vehicle 130. The depiction is of manual application of the tape 10 for accurate preparation of a surface for marking or painting of a vehicle; however, the procedure may likewise be used in the painting or marking of any desired object. The selected arrangement can be checked for suitability prior to beginning placement of the desired material which may consist of a great variety of such items as lines, numbers, pictures, etc., or desired combinations thereof. After the arrangement is selected, with tape(s) 10 left in place as necessary, the items to be illustrated are applied. In many applications, such as vehicle markings, the same markings are to be applied in an exact manner to both sides of the vehicle. In this case, after the arrangement has been selected, in accordance with the invention tape(s) 10 are used to duplicate the arrangement on the other side of the vehicle. In the same manner the desired markings may be duplicated on another or many other of the same model vehicles.

There has been shown and described a unique tape and method that can be used for positioning and mounting objects such as paintings, pictures and mirrors, installing shelving, measuring and cutting of woods and plastics, and many other applications, many without requiring the help of a second person or leaving a measurement mark on the working material. Although the present invention has been described with reference to several illustrated uses, other modifications and embodiments can be devised by those skilled in the art that would fall within the spirit and scope of the invention.

What is claimed is:

1. A measurement tape comprising:
an elongate flexible generally flat strip having parallel straight edges and a first and opposite side, said first side having indicia printed thereon and of a composition permitting erasable writings thereon, and said opposite side having a pressure sensitive adhesive portion;
a first edge of said straight edges including sequentially repeated sections comprised of a twelve-inch section, each one-inch subdivided into one-sixteenth inch segments, and the other of said straight edges comprised of a 25 centimeter section, each centimeter divided into 10 millimeter segments;
symbols located along said tape at repetitive intervals for accepting selected erasable written measurement references therein;
at least one of said straight edges providing a longitudinal level indicator line;
the composition of said tape and said adhesive permits easy removal of said tape from a work surface for repeated reuse of said tape or of selected lengths of said tape; and
wherein said symbols are located along said first edge of said tape at the 4, 8, and 12-inch locations, and along said other edge of said tape at the five and 25 centimeter locations.

2. A measurement tape comprising:
an elongate flexible generally flat strip having parallel straight edges and a first and opposite side, said first side having indicia thereon and said opposite side having a pressure sensitive adhesive backing;
said indicia including first and second sequentially replicated units of measurement along said tape;
indicator markings located along said tape at selected intervals for establishing desired measurement references;
said straight edges providing means for level indicator and plumb line references;
selected symbols repetitively located along said tape for establishing measurement reference points;
the composition of said first side of said tape permits placement of erasable writings thereon with said symbols configured for accepting erasable writings therein for selected reference markings;
said first and second units of measurement divided into prescribed segments of measure;

said prescribed segments of measure are selected from the group comprised of a twelve-inch section, each one-inch subdivided into one-sixteenth inch segments, and a 25 centimeter section, each centimeter divided into 10 millimeter segments; and said twelve inch section is replicated along a first of said straight edges with selected symbols placed at the four inch, eight inch and twelve inch locations and said 25 centimeter section is replicated along the second edge of said straight edges with selected symbols placed at the five and 25 centimeter locations.

3. The measurement tape of claim 2 wherein said symbols along said first edge are triangles of varying sizes, one size positioned to indicate the four inch and eight inch locations and a different size positioned to indicate the twelve inch locations.

4. The measurement tape of claim 3 wherein said straight edges and said triangles provide means to coactively establish level indications and plumb line references.

5. A measurement tape comprising:

an elongate flexible generally flat strip having parallel straight edges and a first and opposite side, said first side having indicia thereon and said opposite side having a pressure sensitive adhesive portion;

said indicia including a selected measurement marking divided into prescribed segments, said marking and segments repeated sequentially along said tape;

said indicia including symbols located at repetitive intervals along said tape configured for accepting writings therein for indicating selected measurement references;

said first side includes spaces for accepting erasable writings;

said selected measurement markings are selected from the group comprised of a twelve-inch section, each one-inch subdivided into one-sixteenth inch segments, and a 25 centimeter section, each centimeter divided into 10 millimeter segments;

a first edge of said straight edges of said tape has the selected measurement marking comprised of said twelve-inch section and the other edge of said straight edges has the selected measurement marking comprised of said 25 centimeter section; and wherein said symbols are located along said first edge of said tape at least at the 4, 8, and 12-inch locations and along said other edge at least at every five and 25 centimeter locations.

6. The measurement tape of claim 5 wherein said symbols are triangles of varying sizes, one size positioned to indicate the four inch and eight inch locations and a different size positioned to indicate the twelve inch locations.

7. The measurement tape of claim 6 wherein said straight edges and said triangles provide means to coactively establish level indications and plumb line references.

8. The measurement tape of claim 5 wherein the composition of said tape and said adhesive permits easily erasable writings on said first side and easy removal of said tape from a work surface for repeated reuse of said tape.

9. The measurement tape of claim 5 wherein the composition of said tape and said adhesive permits easy separation of selected lengths of said tape for utilizing the repetitive features of said tape.

10. The measurement tape of claim 5 wherein the composition of said adhesive includes antibacterial agents.

* * * * *